Aug. 8, 1939.  C. I. RINGER  2,168,745
HOG FEEDER
Filed Sept. 6, 1938   2 Sheets-Sheet 2
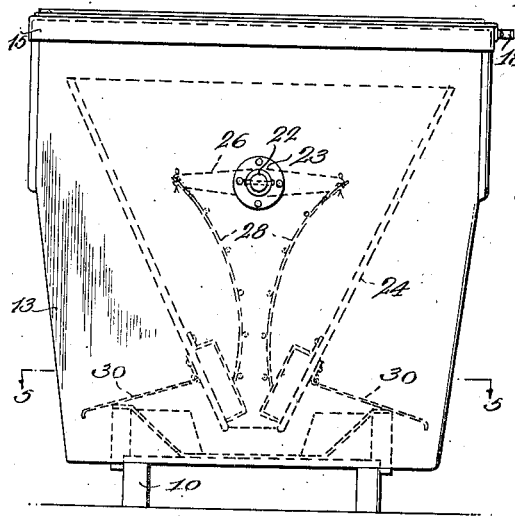
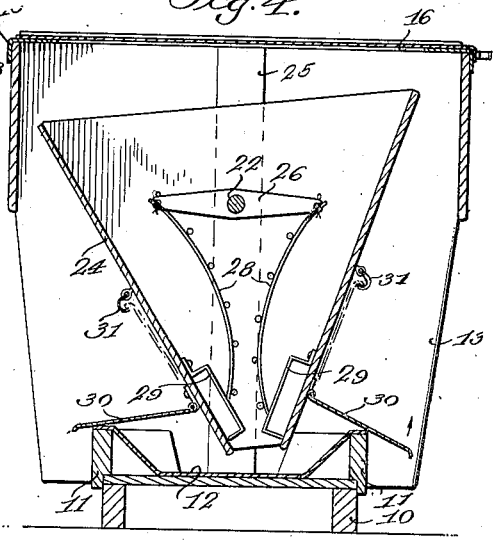
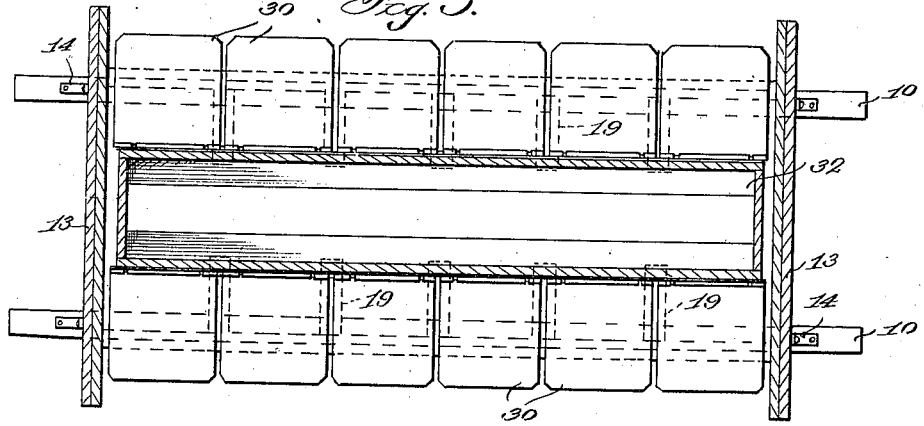
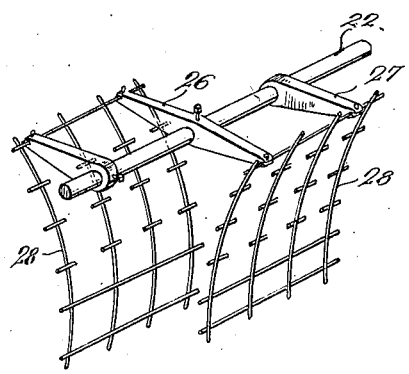
Chauncey I. Ringer
INVENTOR
BY Victor J. Evans & Co.
ATTORNEYS Patented Aug. 8, 1939

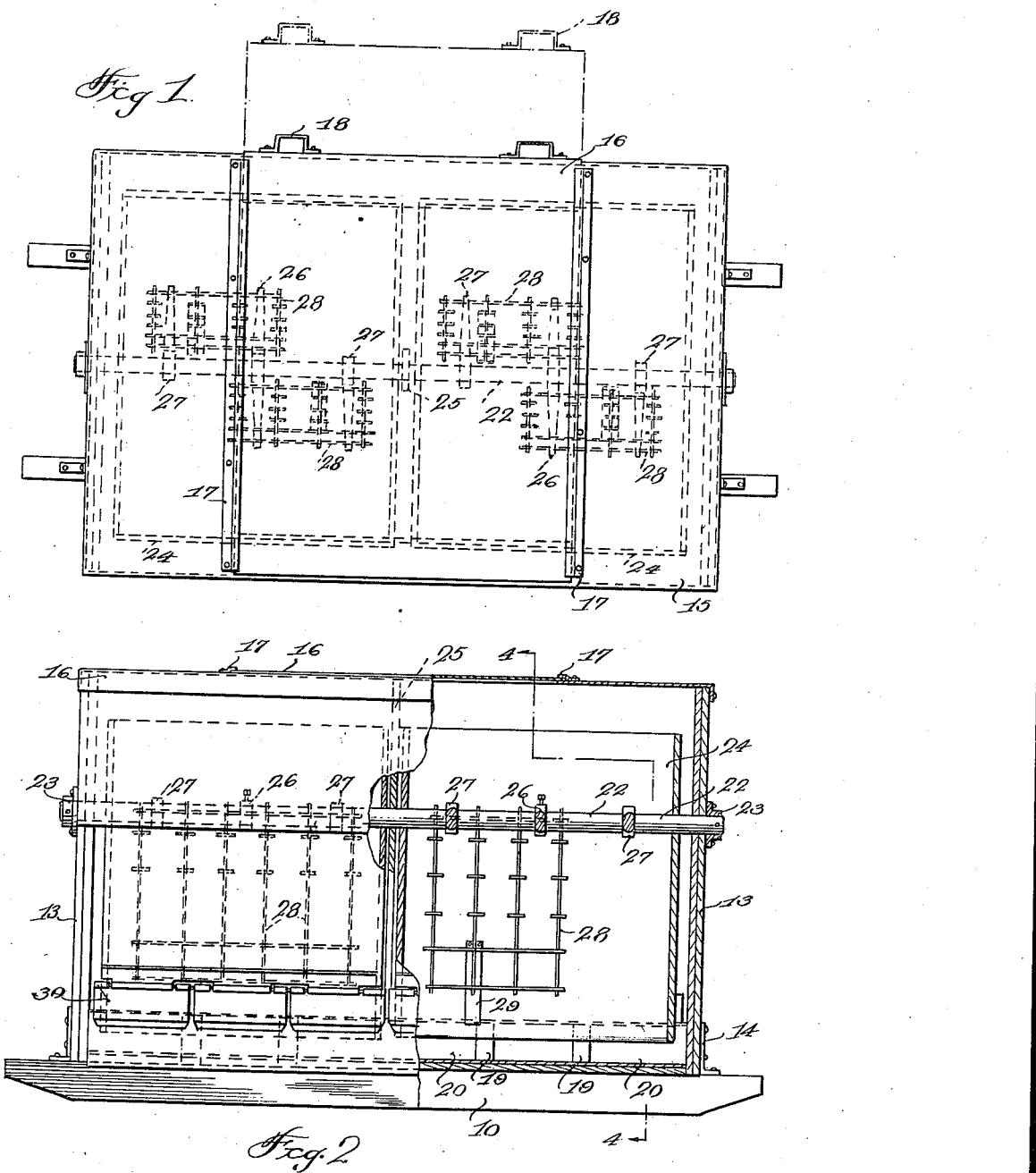

2,168,745

UNITED STATES PATENT OFFICE 2,168,745

HOG FEEDER

Chauncey I. Ringer, Highland, Ohio

Application September 6, 1938, Serial No. 228,651

4 Claims. (Cl. 119—54)

The invention relates to a feeder and more especially to hog feeders for ground feed.

The primary object of the invention is the provision of a feeder of this character, wherein ground feed is placed therein and through movable walls at opposite sides of the body of the feeder agitators are set in motion so as to avoid solidifying of the contents of such feeder and thereby assuring the delivery or the flow of the feed evenly from the body and thus making it constantly accessible to hogs for the feeding of the same.

Another object of the invention is the provision of a feeder of this character, wherein the construction of the same is novel in its entirety in that the hogs when feeding operate the agitators interiorly of the hopper of the feeder so that the feed can not bridge, cake or become in a condition to clog the free flow thereof into the feeding trough and thus stall or block accessibility of the feed in the use of the feeder.

A further object of the invention is the provision of a feeder of this character, wherein the agitator members are hung from a rocking shaft by arms projecting therefrom and are connected with a tilting hopper for the feed so that a positive flow of the latter will be assured and such feed automatically effected.

A further object of the invention is the provision of a feeder of this character, wherein the feed trough is divided into a plurality of pockets, these being selectively closed or opened at the will of the user of the feeder and when closed will be protected from rain, snow, sleet or the like to relieve the wetting of the feed at such time.

A still further object of the invention is the provision of a feeder of this character, which is comparatively simple in its construction, thoroughly reliable and efficient in operation, automatically operated, convenient for the feeding of hogs, strong, durable, and inexpensive to manufacture.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is a top plan view of the feeder constructed in accordance with the invention showing a top lid, by full lines in closed position and by dotted lines in partially open position.

Figure 2 is a side elevation partly broken away.

Figure 3 is an end elevation of a modification.

Figure 4 is a sectional view taken on the line 4—4 of Figure 2 locking in the direction of the arrows.

Figure 5 is a sectional view taken on the line 5—5 of Figure 3 looking in the direction of the arrows.

Figure 6 is a perspective view of the agitator construction.

Similar reference characters indicate corresponding parts throughout the several views in the drawings.

Referring to the drawings in detail, the feeder comprises a pair of spaced parallel base sills 10 of the required length, width and height and has built therewith a feed trough frame 11 in which is removably counterseated a feed trough 12 preferably made from sheet metal, permanently or separably fastened in place.

At opposite ends of the trough and bracketed to the sills 10 are end pieces 13, the brackets being indicated at 14, and such pieces are disposed in perpendicular or upright position, while built with these end pieces is a permanent cover or canopy top 15 having an opening for a lid 16 slidably fitted with said cover or top 15 through the use of guide pieces 17, the lid 16 being provided at one end with handles 18 for manual sliding of this lid to closed or opened positions.

The trough 12 has therein transversely disposed dividing pieces or partitions 19 separating it into a plurality of compartments or pockets 20 at opposite sides of a central longitudinal clearance 21 within the trough as effected by the dividing pieces or partitions 19, thereby presenting individual feeding pockets for hogs.

Arranged elevated with respect to the trough 12 and its longitudinal center is a horizontally disposed shaft 22, being journaled in bearings 23 carried by the end pieces 13 and independently swingable on this shaft 22 is a pair of feed hoppers 24 arranged end to end and spaced from each other by a separator 25 intermediate with respect to the end pieces 13. These hoppers 24, which are open at their bottoms, deliver through gravity feed into the trough 12, that is to say, the pockets or compartments 20, which are accessible exteriorly to hogs for feeding of the same.

The shaft 22 is equipped with laterally extending double and single arm hangers 26 and 27, respectively, alternately. The double and single arm hangers 26 and 27 swingably support reversely curved downwardly directed gratings constituting agitators 28 while loosely contacting with these at their lower ends are coupling yokes 29 fixedly held secured to opposite sides of each hopper 24. The shaft 22 is held in a rigid position by the bearings 23 carried on the end pieces. The agitators 28 are preferably made from heavy steel welded fabric and are suspended from the double and single arm hangers 26 and 27. Each hopper 24 rocks on the shaft 22 as hogs feed on opposite sides of the feeder and such hopper is susceptible of a limited swing causing the agitators 28 to move through the feed resulting in the breaking up thereof and at the same time forcing a constant flow of feed into the trough 12. The hopper is moved by the animal when nosing into the trough 12.

Exteriorly on the side walls of the hopper are drop doors 30, which, when in lowered position, close individually the pockets 20. On raising the doors 30, these will become latched with keepers 31 thus holding the same in open raised position giving free access to the trough 12 and the pockets 20 therein.

The lid 16, on the opening thereof, enables the filling of the hoppers 24 with feed or other contents.

In Figures 3 and 5 of the drawings there is shown a slight modification wherein but a single hopper 32 is employed in the feeder, this being in substitution for two or more hoppers as may be installed in the said feeder.

What is claimed is:

1. A feeder of the character described comprising an immovably supported feed trough, a downwardly tapered vertically swingable hopper above and communicating with said trough, a horizontally arranged shaft swingingly supporting said hopper, hanger arms on said shaft within said hopper and extending toward opposite side walls of said hopper, curved fabric agitators loosely suspended by said hanger arms at opposite sides of said shaft, and means interiorly of the hopper and active upon the said agitators to impart movement thereto and rendering the said agitators active upon contents of the hopper.

2. A feeder of the character described comprising an immovably supported feed trough, a downwardly tapered vertically swingable hopper above and communicating with said trough, a horizontally arranged shaft swingingly supporting said hopper, hanger arms on said shaft within said hopper and extending toward opposite side walls of said hopper, curved fabric agitators loosely suspended by said hanger arms at opposite sides of said shaft, means interiorly of the hopper and active upon the said agitators to impart movement thereto and rendering the said agitators active upon contents of the hopper, and pockets formed in said trough and accessible selectively at opposite sides of the hopper.

3. A feeder of the character described comprising an immovably supported feed trough, a downwardly tapered vertically swingable hopper above and communicating with said trough, a horizontally arranged shaft swingingly supporting said hopper, hanger arms on said shaft within said hopper and extending toward opposite side walls of said hopper, curved fabric agitators loosely suspended by said hanger arms at opposite sides of said shaft, means interiorly of the hopper and active upon the said agitators to impart movement thereto and rendering the said agitators active upon contents of the hopper, pockets formed in said trough and accessible selectively at opposite sides of the hopper, and opening and closing lids arranged with said hopper for the respective pockets.

4. A feeder of the character described comprising an immovably supported feed trough, a downwardly tapered vertically swingable hopper above and communicating with said trough, a horizontally arranged shaft swingingly supporting said hopper, hanger arms upon said shaft within said hopper and extending toward opposite side walls of said hopper, curved fabric agitators loosely suspended by said hanger arms at opposite sides of said shaft, means interiorly of the hopper and active upon the said agitators to impart movement thereto and rendering the said agitators active upon contents of the hopper, pockets formed in said trough and accessible selectively at opposite sides of the hopper, opening and closing lids arranged with said hopper for the respective pockets, and means for the fastening of a selected lid in an open position.

CHAUNCEY I. RINGER.